United States Patent
Roffelsen

(10) Patent No.: US 6,968,863 B1
(45) Date of Patent: Nov. 29, 2005

(54) NON-RETURN VALVE

(76) Inventor: Franciscus Roffelsen, Mauritslaan 7, Helmond (NL) 5707 CM ( * ) Notice: Subject to any disclaimer, the term of this patent is extended or adjusted under 35 U.S.C. 154(b) by 0 days.

(21) Appl. No.: 09/763,078

(22) PCT Filed: Sep. 29, 1999

(86) PCT No.: PCT/NL99/00605

§ 371 (c)(1),
(2), (4) Date: Jun. 4, 2001

(87) PCT Pub. No.: WO00/19134

PCT Pub. Date: Apr. 6, 2000

(30) Foreign Application Priority Data

Sep. 30, 1998 (NL) .................................. 1010223

(51) Int. Cl.[7] .............................................. F16K 15/14
(52) U.S. Cl. ................. 137/860; 137/512.15; 251/900; 277/928
(58) Field of Search .................... 137/512.1, 512.15, 137/860, 493.8; 251/900; 277/910, 928

(56) References Cited

U.S. PATENT DOCUMENTS

| | | | | |
|---|---|---|---|---|
| 3,154,486 A | * | 10/1964 | Weaver | 137/512.1 |
| 3,363,644 A | * | 1/1968 | Malec | 137/860 |
| 3,451,422 A | * | 6/1969 | Chorkey | 137/860 |
| 3,459,217 A | * | 8/1969 | Callahan | 137/512.1 |
| 3,583,430 A | * | 6/1971 | Toennesen | 137/860 |
| 4,497,749 A | * | 2/1985 | Strauss | 137/512.1 |
| 5,660,205 A | * | 8/1997 | Epstein | 137/512.15 |
| 5,762,103 A | * | 6/1998 | Gregoire | 137/512.15 |

FOREIGN PATENT DOCUMENTS

DE 3360 * 5/1878

* cited by examiner

Primary Examiner—Ramesh Krishnamurthy
(74) Attorney, Agent, or Firm—Varnum, Riddering

(57) ABSTRACT

A non-return valve having a circumferential face and a channel with a mouth at one end of the channel and located in a groove having circumferential edges which are adjustable and fixable relative to each other and a valve comprising a O-ring manufactured of an elastic material for releasing the mouth at a predetermined pressure in the channel.

15 Claims, 2 Drawing Sheets

NON-RETURN VALVE

BACKGROUND OF THE INVENTION

1. Field of the Invention

The invention relates to a non-return valve comprising a valve member having a circumferential face and a channel with a mouth on either side, the mouth at one end of the channel being sealable by a valve element capable of releasing said one mouth at a predetermined pressure in the channel higher than an ambient pressure, which valve element comprises an O-ring manufactured from an elastic material, such as a rubber or a resilient plastic, and which one mouth of the channel is located in a groove sealed by the valve element and having circumferential edges provided on parts which are adjustable and fixable relative to each other.

2. Background Art

Such non-return valve is known from German patent specification 201161, wherein the desired blow-off pressure in the channel can be set through a suitable choice of dimensions, design and material of the O-ring and the dimensions and design of the groove in which the sealing O-ring is located. In this known construction, the width of each groove is determined by three adapters that are locally accommodated in the groove with clamp action. For retensioning the O-ring, the non-return valve must be disassembled, the adapters must be replaced by slightly shorter adapters and the non-return valve must subsequently be reassembled. Because of the amount of parts, this operating procedure is not only expensive, labor-intensive and susceptible to failure, but also requires keeping in stock various adapters with a range of accurately determined lengths.

SUMMARY OF THE INVENTION

The object of the invention is to provide a non-return valve of the type described in the preamble, which valve can be assembled from a smallest possible number of relatively simple parts which, accordingly, have a relatively low cost price. More in particular, one may in this respect think of its application for ventilation and blow-off purposes in central heating installations.

In accordance with the invention, these objects are achieved if the circumferential edges are steplessly settable by a setting mechanism so as to be displaceable and lockable relative to each other. Through these features, the changing of the gap width can be realized without requiring disassembling the entire non-return valve. Furthermore, there is achieved the additional, particularly advantageous effect that the non-return valve can be set, adjusted and readjusted in a continuous, stepless manner. Hence, with the non-return valve according to the invention, as far as blow-off pressure is concerned, an extremely accurate adjustment of the non-return valve can be realized and maintained in the course of time.

If, in accordance with a further preferred embodiment of the invention, the setting mechanism comprises a screw connection whereby one circumferential edge is displaceable relative to the other circumferential edge, a precision adjustment of the setting and readjusting of the non-return valve can be realized in an extremely simple manner and with a minimal amount of parts.

The teaching of the invention can be applied with particular advantage to a non-return valve having several parallel blow-off openings, as known from German patent specification 201161, wherein the groove is subdivided by rings and adapters and wherein in the case of unequal adapters, not only the gap covered by the O-ring can vary in width, but the gaps can differ in width relative to each other as well. If, in accordance with a further embodiment of the invention, at least one further ring is provided in the groove so as to be freely displaceable relative to the groove walls, so that the groove is subdivided into several gaps which are all shut off by an O-ring, the problems have been overcome in an effective manner. As a ring can slide freely in axial direction, the O-rings will provide for a correct mutual width distribution of the gaps thus formed, also if in a settable non-return valve one groove wall is displaced relative to the other for performing a fine-adjustment.

In accordance with a further embodiment of the invention, each further ring may be an O-ring, in which case it is preferred that an O-ring that forms a further ring have a greater diameter than an O-ring that forms a valve element. In this embodiment, the further rings need not be manufactured separately, as they are standardly commercially available articles.

From a viewpoint of safety, more in particular for protecting the O-ring against damage caused by carelessness or inattention, it may now be provided that at a distance around the O-ring, a screening cap connected to the valve member is arranged, whose interior is in open communication with the environment.

In accordance with a further embodiment of the invention, a valve acting in two directions can be obtained, if between the mouths on either side of the channel a further mouth is provided which, by means of a further O-ring, is sealable and communicates with a further channel, having a second mouth located outside the channel.

Hereinafter, the non-return valve according to the invention will be further discussed and explained, exclusively by way of example, with reference to embodiments shown in the accompanying drawings.

DETAILED DESCRIPTION

Figure 1:
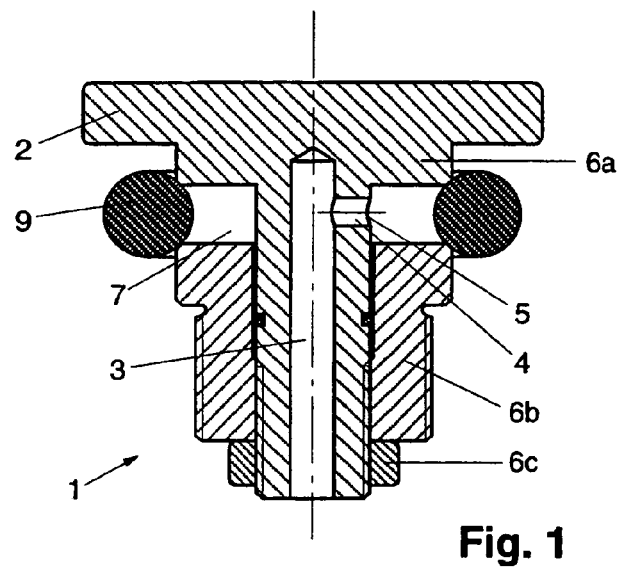
FIG. 1 shows, in cross section, a settable non-return valve.

FIG. 1 shows a non-return valve 1 comprising a valve member 2 having a central channel 3 and a transverse channel 4. The valve member 2 comprises a flange 6a which forms one wall of an annular groove 7 into which the transverse channel 4 opens, at mouth 5, and which is shut off by an O-ring 9. The other wall of the groove 7 is formed by a nut part 6b screwed onto the valve member 2. Thus, the width of the groove 7 and, accordingly, the pre-tension in the O-ring 9 is settable, which O-ring, when the groove 7 is set smaller, is pressed further outwards and can hence be subjected to a higher pre-tension and the other way round. In this manner, the pressure at which the non-return valve 1 blows off can be adjusted and re-adjusted extremely accurately. A lock nut 6c provides for the fixing of the set position of the nut part 6b.

The non-return valve 1 is intended to cause the fluid pressure that prevails in a space enclosed by walls, which space is not shown in the drawing, not to rise above a predetermined value. To that end, by means of, for instance, an external screw thread on the nut part 6b, the non-return valve 1 is fixed in a wall of said enclosed space in such a manner that the end of the channel 3 opens freely into said space, as a result of which the fluid pressure in that space also prevails in the channel 3 and, accordingly, in the transverse channel 4 and, via the mouth 5, in the groove 7. That fluid pressure will thus also attempt to press the O-ring 9 away in outward direction, through extension. When the fluid pressure increases, this will at a given moment cause the O-ring to be released from at least a part of the edges of the groove 7, enabling fluid to escape to the environment until the pressure has been reduced to such extent that the resilience of the O-ring 9 gains the upper hand and the O-ring 9 will again sealingly abut against the edges of the groove 7 by its entire circumference.

Figure 2:
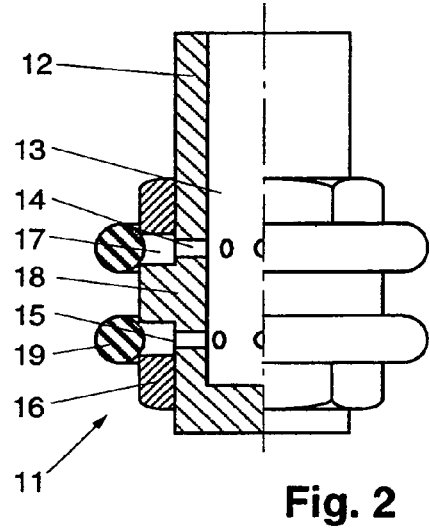
FIG. 2 shows, half in elevation and half in cross section, a non-return valve having a blow-off passage which is enlarged relative to the embodiment of FIG. 1.

FIG. 2 shows, partially in section and partially in elevation, a non-return valve 11 comprising a cylindrical valve member 12 having a central channel 13, ending before the end of the valve member 12. Provided in the wall of the valve member 12 are bores 14 which break through the wall at two levels and which end in a mouth 15 communicating with a groove 17 whose outer top edges form a nest for in each case an O-ring 19. The two grooves 17 are bounded by on the one hand a radial face of a collar 18 on the valve member 12 and on the other a radial face of a nut 16 screwed onto the valve member 12. Thus, the width of the grooves can be varied for adjusting and fine-adjusting the blow-off pressure.

The operation of this non-return valve 11 is substantially identical to that of FIG. 1. Through the use of several transverse channels 14 at several levels, the blow-off passage of the non-return valve 11 has been enlarged considerably compared with that of FIG. 1.

Figure 3:
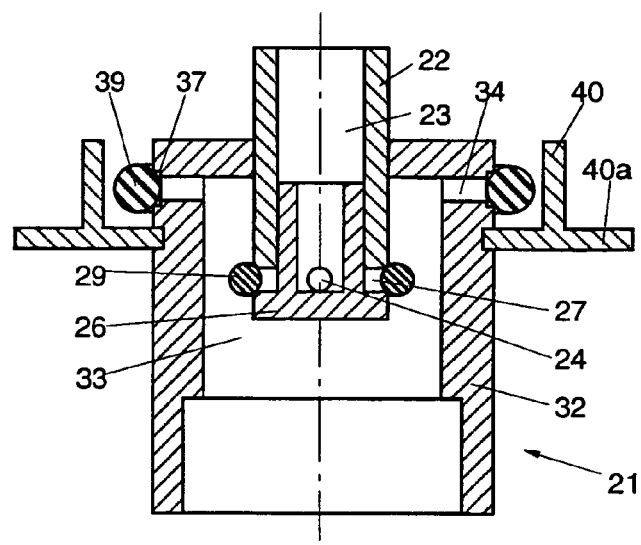
FIG. 3 shows, in cross section, a non-return valve operating in two directions.

FIG. 3 shows a double-acting non-return valve 21 comprising a cylindrical valve member 22 and a cylindrical valve member 32.

The valve member 22 is provided with a central channel 23 into which, at one end, a stop 26 provided with a transverse channel 24 has been screwed. The stop 26 has been screwed into the central channel 23 so far that a groove 27 remains, which is shut off by an O-ring 29 resiliently engaging the valve member 22 and the stop 26. This part of the double-acting non-return valve 21 is operable and settable in the same manner as the non-return valve 1 as discussed with reference to FIG. 1.

The valve member 32 is provided with a central channel 33 having a closure at one end thereof, provided with a bore in which the valve member 22 is sealingly secured such that the O-ring 29 is located in the channel 33. Between the O-ring 29 and the closure of the channel 33, transverse channels 34 are provided in the walls of the valve member 32, which channels open into a circumferential recess 37 for accommodating an O-ring 39 sealing the transverse channels 34. Further, a screening cap 40 for the O-ring 39 is secured on the valve member 32, which screening cap 40 is provided with a radially outwardly extending flange 40a for securing the double-acting non-return valve 21 in a wall of an enclosed space.

During assembly of the non-return valve 21 in said wall, it may for instance be arranged that the open end of the valve member 32 is in open communication with the space whose pressure, prevailing therein, is to be controlled. If that pressure becomes too high, the O-ring 39 recedes until the pressure has regained the desired maximum value, to be set through the choice of the O-ring 39. However, the pressure in said space may also become too low. In that case, the O-ring 29 recedes and fluid is allowed to flow in, until the desired minimum pressure, to be set through the choice of the O-ring 29, prevails in the space. If said enclosed space contains liquid as well as gas, and if the operation of raising the pressure of the enclosed space, for instance in an hot-water system, is to be effected by replenishing liquid, this can be realized by sealingly connecting the open end of the valve member 22 to a stock of liquid for supplementing the quantity of liquid in said space.

Figure 4:
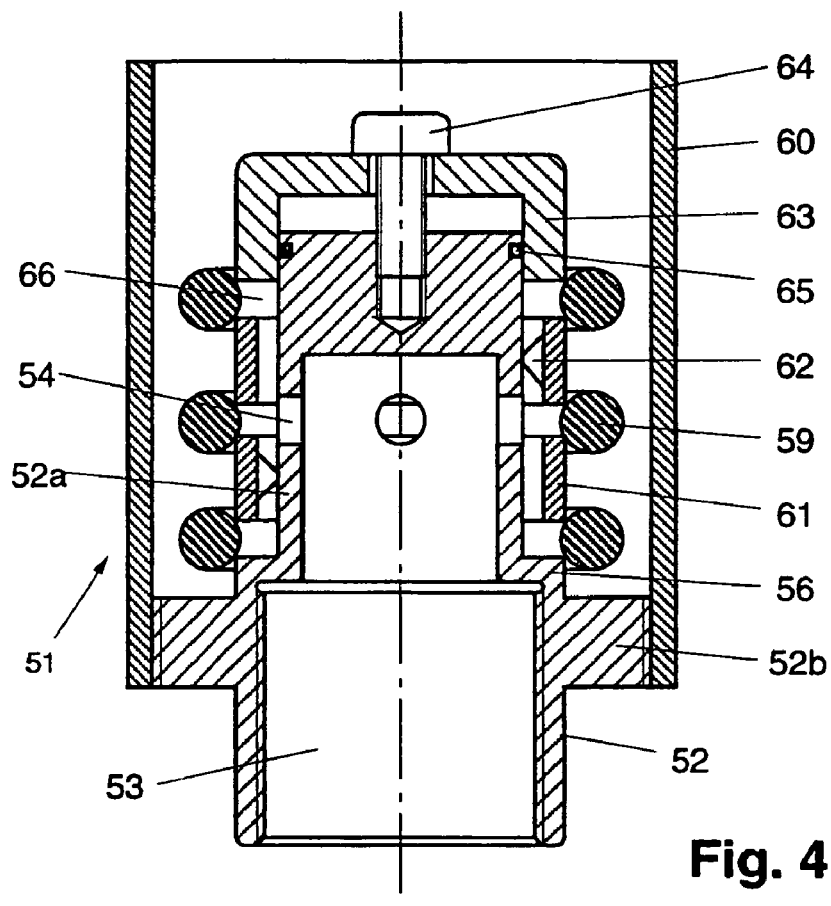
FIG. 4 shows, in cross section, a non-return valve having a blow-off passage which is further enlarged relative to the embodiment of FIG. 2.

FIG. 4 shows a multiple non-return valve 51 of the type as shown in FIG. 2. The non-return valve 51 comprises a valve member 52 having a central channel 53 and a number of transverse channels 54. The valve member 52 further comprises a step 56, staggered flange-wise relative to a part 52a of the valve member in which the transverse channels 54 are located. Provided around that part 52a are two metal rings 61 whose outer diameter equals that of the step 56 and whose inner diameter is greater than the outer diameter of the part 52a, so that the rings 61 surround the part 52a with ample play. To facilitate centering the rings 61 relative to the part 52a, each ring 61 is locally provided with centering projections 62. Further, a sleeve 63 is slidably arranged on the closed end of the part 52a, which sleeve is connected to the part 52a by means of a bolt 64. The sleeve 63 has an outer diameter equal to that of the rings 61 and the step 56 and an inner diameter which slides over the outer circumferential face of the part 52a with a sliding fit, while between the inner circumferential face of the sleeve 63 and the outer circumferential face of the part 52a, a seal 65 is located which allows sliding movement. The rings 61 do not only surround the part 52a with radial play, but are also located with axial play between the sleeve 63 and the step 56. The gaps 66 thus formed between the step 56 and a ring 61, between two rings 61, and between one ring 61 and the sleeve 63 are in each case sealed by an O-ring 59. As the rings 61 can slide freely over the part 52a in axial direction, the three gaps 66 will all automatically obtain the same width dimension. The width dimension of the gaps 66, and hence the blow-off pressure, can be accurately controlled through rotation of the bolt 64. Finally, the valve member 52 further comprises a collar 52b provided with external screw thread to enable mounting a screening cap 60.

Figure 5:
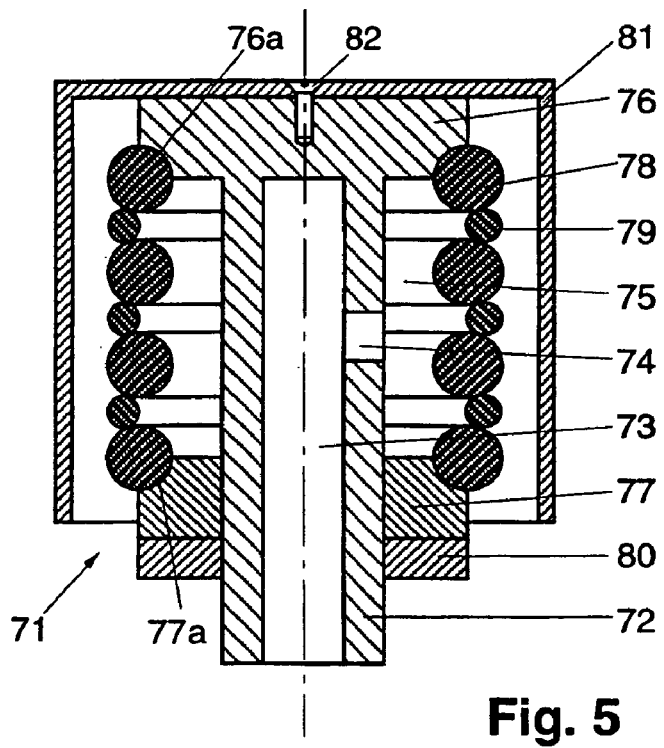
FIG. 5 shows, in cross section, a variant of the non-return valve of FIG. 4.

It is further observed that, if so desired, the centering projections 62 can be omitted, because the O-rings 59 will not only provide for an adjustment in axial direction, but also in radial direction. Further, the rings 61 can also be manufactured from a material other than metal, for instance from rubber or another elastic material. Thus, in the non-return valve 71 according to FIG. 5, the rings 61 have been replaced by O-rings 78. The non-return valve 71 further comprises a valve member 72 having a central channel 73 which, at one end, is shut off by a flange part 76 provided with a seat groove 76a for an O-ring 78. Screwed onto the valve member 72 is a nut 77 likewise provided with a seat groove 77a for accommodating an O-ring 78. Between the O-rings 78 supported in the seat grooves 76a and 77a, there are further located, with play, two further O-rings 78, while an O-ring 79 of a smaller diameter than the O-rings 78 is in each case sealingly provided between every two O-rings 78. The O-rings 78 and 79 located between the two outer O-rings 78 are all spaced from the outer circumferential face of the valve member 72, so as to seal a groove 75 formed between that outer circumferential face, the flange part 76 and the nut 77. The groove 75 communicates with the central channel 73 via a transverse channel 74. The blow-off pressure of the non-return valve 71 can be set, in the manner as described hereinabove, through rotation of the nut 77, which can be fixed in the desired position by a lock nut 80. To protect the O-rings 78 and 79, a screening cap 81 is present, secured on the flange part 76 by means of a screw 82.

It is readily understood that within the framework of the invention as laid down in the appended claims, still many modifications and variants are possible. For instance, for setting the valve, instead of a screw connection, a sliding, lockable connection or any other type of settable connection may be opted for. Further, for an O-ring, any suitable cross section other than circular may be opted for. The same applies to the cylindrical valve members. In addition, a screening cap may also be designed to shut off in perforated form, so that the O-ring is no longer accessible. If the fluid to be blown off must not end up in the environment, the screening cap may be connected to a discharge conduit.

What is claimed:

1. A non-return valve comprising a valve member having a circumferential face and a channel having opposite ends and a mouth at each of the opposite ends, one of the mouths being sealable by a valve element capable of releasing said one mouth at a predetermined pressure in the channel higher than an ambient pressure, said valve element comprising an O-ring manufactured from an elastic material, and said one mouth of the channel being located in a groove sealed by the valve element, and having circumferential edges provided on parts which are adjustable and fixable relative to each other, and a setting mechanism for steplessly setting the circumferential edges such that they are axially displaceable relative to each other, the setting mechanism further including a locking mechanism for locking the circumferential edges at a desired setting.

2. A non return valve according to claim 1 wherein the setting mechanism comprises a screw connection and wherein one of the circumferential edges is displaceable relative to an other circumferential edge, the locking mechanism comprising a lock nut that abuts the screw connection and locks it at a desired adjustment setting.

3. A non-return valve comprising a valve member having a circumferential face and a channel having first and second opposite ends and a first mouth at said first opposite end and a second mouth at said second opposite end;
   a valve element for sealing said channel at one of said opposite ends, said valve element comprising an O-ring manufactured of an elastic material and capable of releasing said first mouth at a predetermined pressure in said channel higher than an ambient pressure;
   said channel comprising a groove having opposing groove walls and wherein said first mouth of said channel is located in said groove and sealed by said valve element, said channel having circumferential edges adjustable and fixable relative to each other;
   a setting mechanism for separately setting said circumferential edges such that said circumferential edges are lockable and displaceable relative to each other;
   at least one further O-ring disposed in said groove and freely displaceable relative to said groove walls, whereby said groove is subdivided into two gaps, each of said gaps being shutoff by one of said plurality of rings.

4. A non-return valve according to claim 3 wherein said at least one further ring is an O-ring.

5. A non-return valve according to claim 3 wherein said further ring and said valve element each comprise an O-ring and wherein said further ring has a diameter greater than a diameter of said O-ring that forms said further ring.

6. The non-return valve according to claim 5 and further comprising a screening cap and disposed around said O-ring, connected to the valve member and having an interior in open communication with a surrounding environment.

7. A non-return valve in accordance with claim 3 and comprising a further mouth disposed between the mouths on either side of the channel, and a further O-ring for sealing said further mouth, and a further channel communicating with said further mouth, said further channel having a second mouth located outside said at least one channel.

8. An adjustable non-return valve means for relieving pressure in an interior of a pressurized enclosure when the pressure reaches a predetermined limit, the valve means being adapted to be mounted on an opening in a wall of the enclosure, the valve means comprising:
   an elongated, cylindrical valve member having axially spaced inner and outer portions, the inner portion being adapted to be in fluid communication with the interior of the enclosure, the outer portion being adapted to be positioned outside of the enclosure, the valve member including:
   a cylindrical portion extending between the inner portion and the outer portion, the cylindrical portion having an internal opening therein that extends outwardly from an open inner end to an outer end spaced inwardly from a closed outer end of the valve member, the valve member having at least one transverse opening extending from the internal opening to an open outlet in a side of the outer portion, the outer portion including an adjustable width circumferential exterior groove in fluid communication with the outlet of the transverse opening, the groove being formed by radially extending flanges positioned at opposite longitudinal sides of the outlet, at least one of the flanges being connected by a threaded connection to the cylindrical portion of the valve member, such that the flange is axially movable on the valve member by rotation of the threaded connection between the flange and the valve body; and
   an elastically resilient O-ring seal mounted under tension on the valve body over the groove so as to resiliently close the outlet, the O-ring seal being in engagement with an outer periphery of the groove such that reducing the width of the groove by decreasing the distance between the flanges urges the O-ring radially outwardly, increasing the tension force exerted by the O-ring on the groove, thereby increasing the pressure at which the valve will relieve the pressure in the interior of the enclosure.

9. An adjustable non-return valve as in claim 8 wherein the threaded connection comprises an externally threaded surface on the cylindrical portion of the valve member that mates with an internally threaded opening in the movable flange.

10. An adjustable non-return valve as in claim 8 wherein the flanges have cylindrical outer surfaces adjacent planar opposing surfaces that are substantially perpendicular to a longitudinal axis of the valve member, the flanges thereby forming generally right angle edges where they engage the O-ring, the right angle edges enhancing the sealing engagement between the valve member and the O-ring.

11. An adjustable non-return valve as in claim 10 wherein the O-ring rides on top of the groove, such that if the width of the groove is adjusted to make the groove more narrow, the edges of the groove will engage a radially inward side of the O-ring and urge the O-ring to expand radially outwardly, increasing the pressure at which the valve relieves the pressure in the enclosure.

12. An adjustable non-return valve as in claim 9 and further comprising locking means for locking the movable flange at a desired axial position on the valve member.

13. An adjustable non-return valve as in claim 12 wherein the locking means comprises a lock nut threaded on the valve body adjacent the movable flange, such that rotation of the lock nut into locking engagement with the movable flange serves to lock the movable flange in a fixed position on the valve member.

14. An adjustable non-return valve as in claim 8 wherein the movable flange is positioned axially inwardly from the other flange, the movable flange having a threaded cylindrical exterior portion that is engageable with a threaded opening in the wall of the enclosure for mounting the valve therein, the valve thereby being mountable in the enclosure by rotating the movable flange without exerting a relative torque between the valve member body and the movable flange.

15. An adjustable non-return valve as in claim 8 wherein the O-ring seal has a generally circular cross sectional shape.

* * * * *